(12) United States Patent
Mohan et al.

(10) Patent No.: US 11,204,861 B2
(45) Date of Patent: Dec. 21, 2021

(54) SYSTEMS AND METHODS FOR FAULT INJECTION AND ENSURING FAILSAFE FMS SAAS PLATFORMS

(71) Applicant: HONEYWELL INTERNATIONAL INC., Morris Plains, NJ (US)

(72) Inventors: Rajeev Mohan, Bangalore (IN); Ramkumar Rajendran, Theni District (IN); Kirupakar Janakiraman, Madurai (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/804,970

(22) Filed: Feb. 28, 2020

(65) Prior Publication Data
US 2020/0285571 A1 Sep. 10, 2020

(30) Foreign Application Priority Data
Mar. 5, 2019 (IN) .............................. 201941008510

(51) Int. Cl.
*G06F 9/44* (2018.01)
*G06F 11/36* (2006.01)

(52) U.S. Cl.
CPC ...... *G06F 11/3692* (2013.01); *G06F 11/3612* (2013.01); *G06F 11/3664* (2013.01); *G06F 11/3688* (2013.01)

(58) Field of Classification Search
CPC ............. G06F 11/3692; G06F 11/3612; G06F 11/3664; G06F 11/3688
See application file for complete search history.

(56) References Cited

U.S. PATENT DOCUMENTS

| 8,707,104 | B1* | 4/2014 | Jean ..................... G06F 11/2215 714/41 |
| 2004/0163079 | A1* | 8/2004 | Noy ..................... G06F 11/3409 717/154 |
| 2006/0126799 | A1 | 6/2006 | Burk |
| 2007/0168751 | A1* | 7/2007 | Lau ..................... G06F 11/3419 714/41 |
| 2010/0223497 | A1 | 9/2010 | Schneider |

(Continued)

OTHER PUBLICATIONS

European Search Report dated Jul. 8, 2020 in counterpart European Patent Application No. 20161336.1 (10 pages, in English).

*Primary Examiner* — Hang Pan
(74) *Attorney, Agent, or Firm* — Bookoff McAndrews, PLLC

(57) ABSTRACT

Disclosed are methods, systems, and non-transitory computer-readable medium for fault injection and ensuring failsafe FMS SaaS platforms. For instance, the method may include observing a behavior of a platform; building a hypothesis about a steady state behavior based on the observing the behavior of the platform; determining whether a request for fault injection has been received; in response to receiving the request for the fault injection, performing the fault injection; observing a response of the platform to the fault injection; determining whether the fault injection is at an end; and in response to determining that the fault injection is at the end, collect and analyze data of observed response(s).

17 Claims, 5 Drawing Sheets

(56) References Cited

U.S. PATENT DOCUMENTS

| | | | |
|---|---|---|---|
| 2012/0144244 A1* | 6/2012 | Dan | G11C 29/56 |
| | | | 714/39 |
| 2015/0378859 A1 | 12/2015 | Jang et al. | |
| 2017/0024299 A1* | 1/2017 | Deng | G06F 11/263 |
| 2017/0046146 A1* | 2/2017 | Jamjoom | G06F 8/71 |
| 2017/0242784 A1* | 8/2017 | Heorhiadi | G06F 11/3692 |
| 2018/0089011 A1 | 3/2018 | Basiri et al. | |
| 2018/0253372 A1* | 9/2018 | Colaiacomo | G06F 11/368 |

* cited by examiner

SYSTEMS AND METHODS FOR FAULT INJECTION AND ENSURING FAILSAFE FMS SAAS PLATFORMS

CROSS-REFERENCE TO RELATED APPLICATION(S)

This application claims the benefit of priority under 35 U.S.C. § 119 from Indian Patent Application No. 201941008510, filed on Mar. 5, 2019, the contents of which is incorporated by reference in its entirety.

TECHNICAL FIELD

Various embodiments of the present disclosure relate generally to systems and methods for fault injection and ensuring failsafe SaaS platforms and, more particularly, to systems and methods for fault injection and ensuring failsafe FMS SaaS platforms.

BACKGROUND

Companies and enterprises are expanding into next-generation digital ecosystems and shifting from standalone products to shared, collaborative, and/or on-demand services. Fault tolerance may be a dependability requirement in distributed and cloud software systems. For instance, in distributed and cloud software systems, components can fail in arbitrary ways, but a high availability or reliability of a service provided by the distributed and cloud software systems is nevertheless required. Some examples that increase the likelihood of faults may be the number of services that are provided by a hosting platform, feature interaction between the services, geographical distribution of the hosting platform for the services, security of the platform, and configurability requirements of the services on the platform, different execution environments, and human operation or configuration errors.

However, traditional software testing approaches may not be sufficient for identifying the potential failures of distributed and cloud software systems.

The present disclosure is directed to overcoming one or more of these above-referenced challenges.

SUMMARY OF THE DISCLOSURE

According to certain aspects of the disclosure, systems and methods are disclosed for fault injection and ensuring failsafe SaaS platforms.

For instance, a method may include: observing a behavior of a platform; building a hypothesis about a steady state behavior based on the observing the behavior of the platform; determining whether a request for fault injection has been received; in response to receiving the request for the fault injection, performing the fault injection; observing a response of the platform to the fault injection; determining whether the fault injection is at an end; and in response to determining that the fault injection is at the end, collect and analyze data of observed response(s).

Moreover, a system may include: a guidance panel; a memory storing instructions; and a processor executing the instructions to perform a process. The process may include: observing a behavior of a platform; building a hypothesis about a steady state behavior based on the observing the behavior of the platform; determining whether a request for fault injection has been received; in response to receiving the request for the fault injection, performing the fault injection; observing a response of the platform to the fault injection; determining whether the fault injection is at an end; and in response to determining that the fault injection is at the end, collect and analyze data of observed response(s).

Furthermore, a non-transitory computer-readable medium may store instructions that, when executed by a processor, cause the processor to perform a method. The method may include: observing a behavior of a platform; building a hypothesis about a steady state behavior based on the observing the behavior of the platform; determining whether a request for fault injection has been received; in response to receiving the request for the fault injection, performing the fault injection; observing a response of the platform to the fault injection; determining whether the fault injection is at an end; and in response to determining that the fault injection is at the end, collect and analyze data of observed response(s).

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
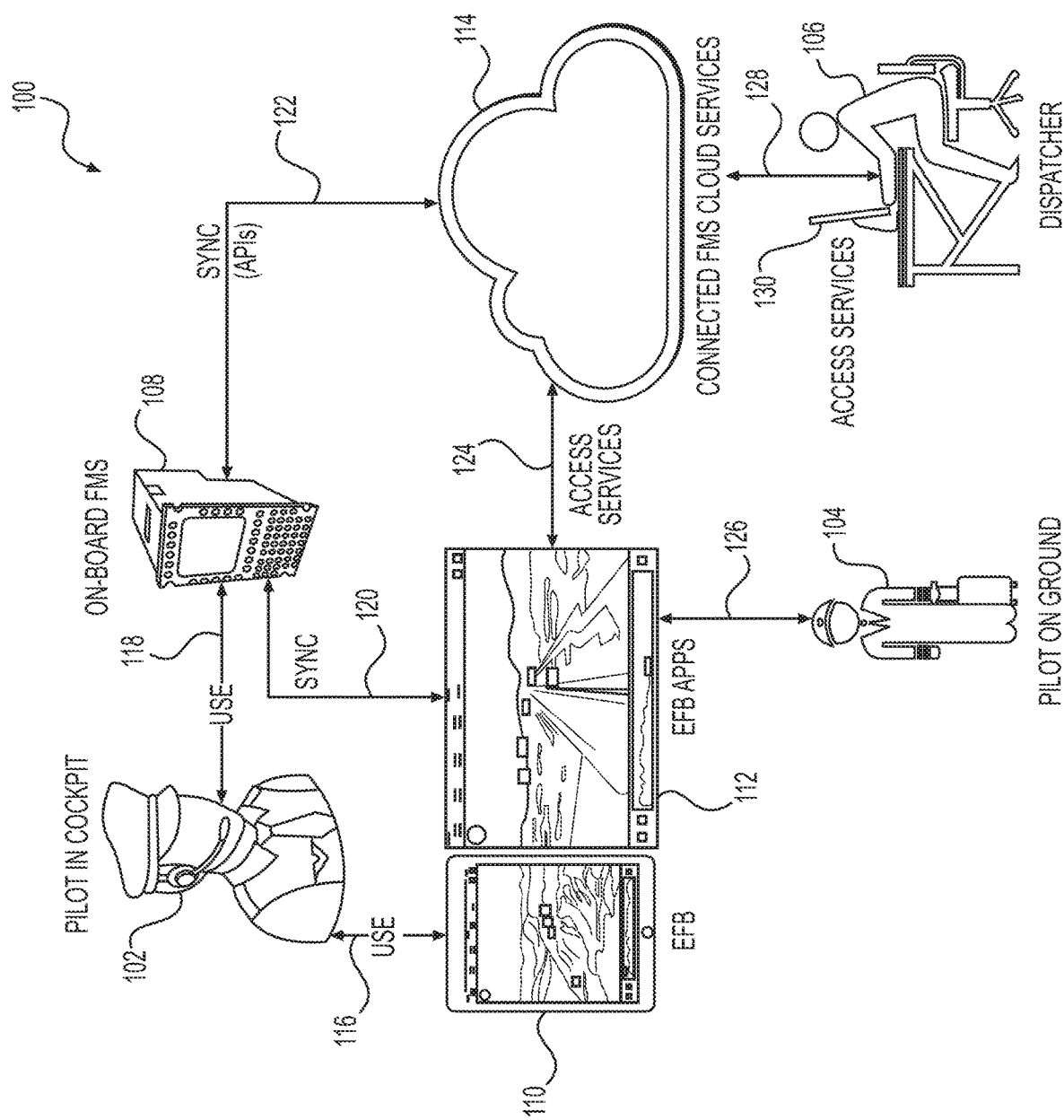
FIG. 1 depicts an overview of an example environment in which systems, methods, and other aspects of the present disclosure may be implemented.

Various embodiments of the present disclosure relate generally to systems and methods for fault injection and ensuring failsafe FMS SaaS platforms.

In general, the present disclosure is directed to systems and methods for fault injection and ensuring failsafe FMS SaaS platforms by performing a fault injection and observing responses of the FMS SaaS platform. For instance, fault injection based on user context/service level criticality, is a mechanism for assessing the resilience of services of the FMS SaaS platform, without impacting the end customers. Fault injection may include randomized scaling of load, modification of messages and/or data, and/or injecting inputs while simultaneously removing infrastructure elements. The FMS SaaS platform may perform the fault injection while still ensuring a sufficient service level based on user-context and criticality.

For instance, some examples of failure modes, based on observed failures inside a FMS SaaS platform may include (1) overloaded cloud tenant, and (2) error caching. An overloaded cloud tenant may occur when a FMS SaaS platform is overloaded by requests and/or processing, and the FMS SaaS platform may take an increasing amount of time to respond to requests. For instance, one of the clients may place an outbound request on an unbounded local queue, and, over time, the local queue consumes more and more memory, thereby causing the client to fail. Error caching may occur when an avionics client makes a request to a service that is fronted by a cache; the service returns a transient error which is incorrectly cached; other clients make the same request; and the other clients are served an error response based on the transient error from the cache.

Furthermore, other categories of faults of a FMS SaaS platform may be related to hosting infrastructure, such as (1) physical node faults, (2) virtualization level faults, (3) service level faults, and/or (4) network faults. Physical node faults may occur when hardware fails at random due to environmental stress or burn-in and wear-out phenomena. Virtualization level faults may occur when a hypervisor service crashes or performs incorrectly (e.g., intrusive on separate domains), or when there are erroneous network configurations. Service level faults may occur when interactions between different services of the FMS SaaS platform malfunction, e.g., an API might be used in unexpected or incorrect ways. Network faults may occur when a network between components of the FMS SaaS platform becomes unreliable and partitioned.

Physical node faults may be injected by cutting off messages from those nodes (e.g., by submitting an API call to no longer send out messages or node hooks) or cause increased CPU utilization by starting more compute jobs. Virtualization level faults may be injected at the at the hypervisor level. For instance, virtualization level faults may be injected at the hypervisor level by concurrent hosting of multiple virtual machines (VMs), over-commitment, or forcing violated CPU quotas, and environment variables in VMs may be modified. Service level faults may be injected by submitting improperly formatted/structured requests to API endpoints of the services of the FMS SaaS platform directly. Exhausted rate limits can be simulated by re-configuring the compute API. Network faults may be injected by causing messages to be delayed or lost, and/or causing partial or total network partitions between components of the FMS SaaS platform.

While some aspects of the disclosure are directed to fault injection and ensuring failsafe FMS SaaS platforms, it should be appreciated that the present systems and methods are applicable to fault injection and ensuring failsafe SaaS platforms for SaaS platforms of other cloud aircraft systems or cloud-based services for other vehicles. The other cloud aircraft systems may include synthetic vision systems (SVS), ground proximity warning systems (GPWS), radar systems, engine systems, wheel systems, brake systems, power systems, or auxiliary power systems. The other vehicles may include drones, automobiles, ships, or any other autonomous and/or Internet-connected vehicle. Moreover, it should be appreciated that the present systems and methods are applicable to fault injection and ensuring failsafe SaaS platforms in general.

Referring now to the appended drawings, FIG. 1 shows an overview of an example environment 100, according to one or more embodiments of the present disclosure. The environment 100 may be an example of a FMS SaaS platform that may automatically and randomly test for faults to ensure that the FMS SaaS platform is failsafe. The environment 100 may, for example, include an EFB (electronic flight bag) 110, an on-board FMS 108, a connected FMS cloud services platform 114, and/or a dispatcher device 130.

The EFB 110 may be a computer device carried by a pilot or a flight crew. The EFB 100 may store, for example, navigational charts, maps for air and ground operations of an aircraft, a flight plan management system, an aircraft operating manual, flight-crew operating manual, software applications which automate flight-related or avionics-related computation tasks, and/or any application or data which may be installed in a general purpose computing platform. The on-board FMS 108 may be any specialized computer system physically installed in an aircraft (e.g., the cockpit). The on-board FMS 108 may be programmed and/or customized to service the flight crew of the aircraft with in-flight tasks. The dispatcher device 130 may be any computer device which may be accessed by a user who performs planning, flying, navigating, or managing tasks associated with aircrafts, airspaces, airports, or flight plans. Accordingly, the user is not limited to a dispatcher, and the dispatcher device 130 is not limited to a device of a dispatcher. The connected FMS cloud services platform 114 may be a cloud-based platform. The connected FMS cloud services platform 114 may provide FMS services (including responding to API mashup requests and processing of API requests) to any user who has authorized access to the platform, as described in further detail below.

As shown in FIG. 1, the environment 100 may accommodate access by various types of users. For example, a pilot in cockpit 102 may have access to the EFB 110, EFB applications 112 installed in an EFB 110, and/or the on-board FMS 108 for accessing the connected FMS cloud services platform 114. Because of the fundamental avionic functions continually provided by the on-board FMS 108 during a flight, a pilot in cockpit 102 may use on-board FMS 108 as the sole or primary avionic system for performing in-flight tasks and operations 118. Additionally, the pilot in cockpit 102 may also use the EFB 110 within the cockpit (e.g., on a tablet or any other portable computing device), as a back-up FMS access device and/or a supplemental avionic device. The EFB applications 114 may access the connected FMS cloud service platform 114, and provide the FMS services to the users of the EFB 110 in which the EFB applications 114 are installed. In that way, the EFB 110 may provide user-friendly and customized user interfaces, by which FMS services from the platform 114 may be serviced, for example, to the pilot in cockpit 102.

The on-board FMS 108 may also be configured to synchronize data 122 with connected FMS cloud services platform 114, using, for example, an application programming interface (API). In addition, the on-board FMS 108 may also be configured to synchronize data 120 with EFB applications 112. Thus, in some implementations, the on-board FMS 108 may be synchronized with data from both EFB 110 and the platform 114 in real-time or at predetermined intervals, in such a way that the pilot in cockpit 102 may rely on the on-board FMS 108 for all tasks arising in the environment 100.

A pilot on ground 104 may also access the EFB 110 and the EFB applications 112. In some implementations, the pilot on ground 104 and the pilot on cockpit 102 may be the same pilot, yet under different circumstances (e.g., time and location of the access). Additionally, or alternatively, the pilot on ground 104 may be a different pilot, or another authorized member of the flight crew, who accesses EFB 110 on the ground for an official duty related to the connected FMS cloud services 114. While the pilot on ground 104 is accessing the EFB applications 112 via EFB 110, the EFB applications 114 may access the connected FMS cloud service platform 114, and receive various FMS services from it. In that way, the EFB 110 may provide user-friendly and customized user interfaces, by which FMS services 126 from the connected FMS cloud service platform 114 may be serviced to the pilot on ground 104.

A dispatcher 106 may also access the connected FMS cloud services platform 114, through a dispatcher device 130. A dispatcher, in accordance with the present disclosure, may be any authorized personnel performing duties related to dispatching of aircrafts in the environment 100. For example, a dispatcher may be an airline staff, an airport staff, air traffic control personnel, a ground control personnel, a member of a relevant aviation authority, or any other authorized person who may benefit from FMS services from the connected FMS cloud services platform 114 in performing his/her duties. A dispatcher device 130 may be any computing device capable of establishing a connection 128 to the cloud and interfacing with the connected FMS cloud services platform 114. While a dispatcher 106 is accessing the FMS services via the dispatcher device 130, the dispatcher device 130 may access the connected FMS cloud service platform 114, and receive various FMS services from it. In that way, the dispatcher device 130 may provide user-friendly and customized user interfaces, by which FMS services 126 from the connected FMS cloud service platform 114 may be serviced to the dispatcher 106.

The on-board FMS 108, the EFB 110 and the dispatcher device 130 may include one or more devices capable of receiving, generating, storing, processing, and/or providing information associated with FMS services. For example, the on-board FMS 108, the EFB 110 or the dispatcher device 130 may include a communication and/or computing device, such as a mobile phone (e.g., a smart phone, a radiotelephone, etc.), a computer (e.g., a desktop computer, a laptop computer, a tablet computer, a handheld computer), a gaming device, a wearable communication device (e.g., a smart wristwatch, a pair of smart eyeglasses, etc.), or a similar type of device.

As indicated above, FIG. 1 is provided merely as an example. Other examples are possible and may differ from what was described with regard to FIG. 1. The number and arrangement of devices and networks shown in FIG. 1 are provided as an example. In practice, there may be additional devices, fewer devices and/or networks, different devices and/or networks, or differently arranged devices and/or networks than those shown in FIG. 1. Furthermore, two or more devices shown in FIG. 1 (e.g., EFB 110 and dispatcher device 130) may be implemented within a single device, or a single device shown in FIG. 1 (e.g., EFB 110, on-board FMS 108, or dispatcher device 130) may be implemented as multiple, distributed devices. Additionally, or alternatively, a set of devices (e.g., one or more devices) of environment 100 may perform one or more functions described as being performed by another set of devices of environment 100.

Figure 2:
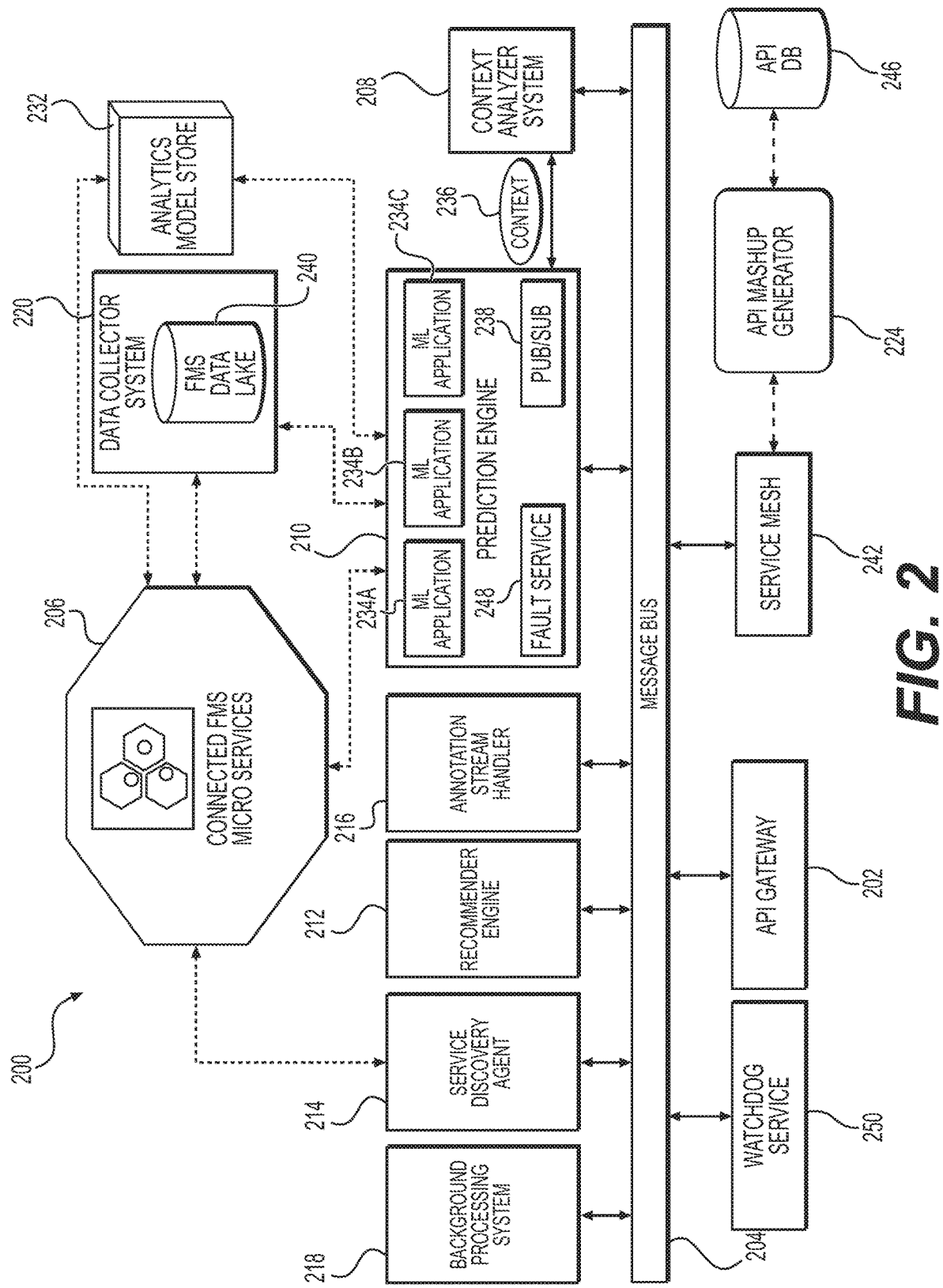
FIG. 2 depicts a block diagram schematically showing a connected FMS cloud services platform, according to one or more embodiments.

FIG. 2 depicts a block diagram schematically showing an example environment 200 in the connected FMS cloud services platform 114, according to one or more embodiments. The environment 200 (e.g., the connected FMS cloud services platform 114) may be an example of a FMS SaaS platform that may automatically and randomly test for faults to ensure that the FMS SaaS platform is failsafe, so that the environment 200 (e.g., the connected FMS cloud services platform 114) may, in response to the request for a micro-service, process the request, and transmit a response based on the processing of the request.

As shown in FIG. 2, the environment 200 may include an API (application programming interface) gateway 202, a message bus 204, servicing modules 208-220, connected FMS micro-services 206, a service mesh 242, an API mashup generator 244, an API database (DB) 246, a fault service 248, and/or a watchdog service 250. In some implementations, the environment 200 may correspond to the connected FMS cloud services platform 114, with the API gateway 202 allowing the communications 122, 124, and 128 depicted in FIG. 1. Components, devices, and modules of environment 200 may interconnect via wired connections, wireless connections, or a combination of wired and wireless connections.

The API gateway 202 may be a component which may serve as a point of entry for a group of micro-services, such as the connected FMS micro-services 206, the service mesh 242, and/or the API mashup generator 244. Depending upon various use cases, the API gateway 202 may be configured to accommodate requests or communications (e.g., requests from on-board FMS 108, EFB applications 112, or dispatcher device 130), invoke multiple back-end services (e.g., services by connected FMS micro-services 206) and aggregate and/or coordinate the results. The API gateway 202 may be in communication with the message bus 204, in order to communicate with the various back-end services. In addition, the API gateway 202 may be, for example, configured to be updated each time a new micro-service is added or removed in the connected FMS micro-services 206. The API gateway 202 may be implemented as hardware, software, and/or a combination of hardware and software.

The message bus 204 may be a connecting middleware between servicing modules 202-220, which enable the servicing modules 202-220 to interconnect and communicate amongst each other using messaging. The message bus 204 may include a messaging infrastructure, where each servicing module, for example, may provide data and allow other servicing modules to use them according to the modules' specific use cases. The message bus 204 may support, for example, single request/reply communications, group request/reply communications, and broadcast functions. In some implementations, servicing modules may provide data onto the message bus without mandating how the data are to be used, thereby resulting in free flow of data which allows various servicing modules to non-destructively consume and/or utilize those messages. The API gateway 202 may be implemented as hardware, software, and/or a combination of hardware and software.

The connected FMS micro-services 206 may be FMS services organized as a collection of specialized modular services. In some implementations, the connected FMS micro-services 206 may be software applications stored, at least in part, in one or more servers remote from on-board FMS 108, EFB 110, and dispatcher device 130, for cloud-based access from at least one of these devices. The connected FMS micro-services 206 may be modular services which are developed, deployed and scaled independently of each other, messaging-enabled to communicate with various components within the environment 200, and organized around capabilities. The connected FMS micro-services 206 may include, for example, flight planning services, in-flight navigation services, airport specific services, ground communication services, weather services, services for computing fuel scenarios, services for computing optimization scenarios, services for offsetting deviations, and services for computing approach procedures (collectively "FMS atomic services" of avionics atomic services 306). The connected FMS micro-services 206 may be implemented as hardware, software, and/or a combination of hardware and software.

The FMS atomic services may be accessed by one or more FMS cloud APIs. Specifically, the API gateway 202 may receive API requests from a user device, in accordance with the one or more FMS cloud APIs, and process the API request by routing the API request to a FMS atomic service. The FMS atomic service may processes the API request and transmits a response to the API gateway 202. The API gateway 202 may transmit the response to the user device.

A context analyzer system 208 may be a servicing module included in the environment 200. The context analyzer system 208 may receive one or more context analysis parameters, use the parameters to determine contexts, and provide one or more contexts to the message bus and/or the prediction engine 210. Subsequently, the one or more determined contexts may be used at any other component connected to the context analyzer system 208 in the environment 200. The one or more contexts may be, for example, a flight context, an airport context, or a weather context, and the contexts may be determined from communicating with a cockpit, a ground system, an airport database system, and/or connected weather services. By determining contexts, the accuracy and efficiency of services provided by the environment 200 may be enhanced by adding intelligence to the ways that the services deliver results. For example, determining pending flight information and airport status information as contextual data may enable the prediction engine 210 to more accurately and dynamically predict which flight plan requests would be received in the next few hours. The contextual data provided by the context analyzer system 208 may be used for various use cases in the environment 200, as described in further detail below. The context analyzer system 208 may be implemented as hardware, software, and/or a combination of hardware and software.

A prediction engine 210 may be another servicing module included in the environment 200. The prediction engine may be in connection with the message bus, as well as with the connected FMS micro-services 206, FMS data lake 240, analytics model store 232, and/or the context analyzer system 208. The prediction engine 210 may predict FMS services which are required for specific contexts, or predict data which may be necessary for an FMS service(s) or an operation of another servicing module(s). Predictions provided by the prediction engine 210 may be used for various use cases in the environment 200. The prediction engine 210 may be implemented as hardware, software, and/or a combination of hardware and software.

The prediction engine 210 may include machine learning applications 234A-234C. While three machine learning applications (234A, 234B, and 234C) are depicted by way of example, the prediction engine 210 may be configured to include any number of one or more machine learning applications based on predetermined preferences. In some implementations, output(s) from one or more of the included machine learning applications may become input(s) for different one or more of the machine learning applications to arrive at inference or prediction results. Additionally, one or more of the included machine learning applications may, for example, have streaming analytics capability along with down sampling of data. The prediction engine 210 may, for example, use the machine learning applications 234A-234C trained on a training set (e.g., FMS micro-services that have been called under certain contexts) in order to analyze the FMS micro-services being correlated with certain contexts, generate a score for contexts representing a similarity to a given context, and select one or more FMS micro-services associated with contexts over a threshold score. In some implementations, the prediction engine 210 may analyze prior predictions, to the extent obtainable from environment 200 and/or other environments, to train the machine learning applications 234A-234C (e.g., using one or more big data techniques) and determine predictions of FMS services which are required for specific contexts, or data predicted to be necessary.

An analytical model store 232 may be a repository that may store pre-built machine learning models, each with its respective model index. The repository may be, for example, a centralized, cloud-based data repository. A model index may include, for example, information related to the purpose of the model, training data set, and the accuracy of the machine learning model. The prediction engine 210 may utilize one or more models from the analytical model store 232 based upon runtime needs. In addition, the prediction engine may include PUB/SUB component 238, which may be publisher/subscriber component that may operate on the message bus 204. In some implementations, the prediction engine 210 may use PUB/SUB 238 component to receive notifications from the message bus 204 by subscribing to certain event topics, and/or publish messages onto the message bus 204 to notify other peer applications.

A recommender engine 212 may be another servicing module included in the environment 200. The recommender engine 212 may be configured to determine one or more recommendations associated with the one or more FMS services, based on one or more recommendation requests, the one or more contexts, and/or the prediction data. The recommendation requests may be received from on-board FMS 108, EFB applications 112, or dispatcher device 130. Additionally, or alternatively, the recommendation requests may be received from any other servicing modules in the environment 200 or any of the connected micro-services 206. The determined recommendations may be, for example, different flight plans based on conditions relating to weather, traffic, and/or terrain, or one or more aircraft performance options (e.g., cost index calculations for an aircraft) based on one or more predicted scenarios (e.g., data predicted at the prediction engine 210). The recommender engine 212 may be implemented as hardware, software, and/or a combination of hardware and software.

A background processing system 218 may be a servicing module included in the environment 200. In some implementations, a service discovery agent 214 and annotation stream handler 216 may be modules controlled by the background processing system 218, and/or sub-modules included in the background processing system 218. For example, a service discovery agent 214 may identity the most appropriate available micro-service which may be dynamically required for the avionics application needs, and bind an application connection request to the identified micro-service. An annotation stream handler 216 may, for example, help the connected FMS cloud services modules 208-220 and the FMS micro-services 206 to refine the telemetry data from IoT (Internet of Things) cloud communication channel(s). In implementations where the service discovery agent 214 and the annotation stream handler 216 are included in the background processing system 218, the modules service discovery agent 214, annotation stream handler 216, and background processing system 218 may be collectively referred to as the background processing system 218. In some other implementations, the service discovery agent 214 and annotation stream handler 216 may be in communication with the background processing system 218, as separate modules in the environment 200. The service discovery agent 214 may discover one or more service(s) (e.g., FMS micro-services) to identify, for example, the discovered one or more service(s) as a scheduled service(s) that the background processing system 218 to prepare background support data for. The annotation stream handler 216 may, for example, create and manage annotations of data streams which are received and/or produced by the background processing system 218. For example, to coordinate delivery of large volume of data (e.g., background support data being delivered to data collector system 220), the annotation stream handler 216 may provide semantic annotation of streaming data to support dynamic integration of the prepared data into the predicted FMS micro-service(s).

The background processing system 218 may be configured to identify one or more background operations to support an operation of a first FMS service, and generate background support data for the first FMS service using the one or more background operations. The first FMS service may be, for example, a FMS micro-service, among the connected FMS micro-services 206, which is predicted by the prediction engine 210 as the FMS micro-service that may be required to run at a certain time based on a given context. As another example, the first FMS service may be a set of one or more micro-services, which may be scheduled to run in a particular time frame in the future. Once the first FMS service is identified, the background processing system 218 may identify one or more background operations to generate support data for the first FMS service. The background operations may be one or more FMS micro-services from the connected FMS micro-services 206, one or more software services from a source other than the connected FMS micro-services 206, or a combination thereof. The background processing system 218 may execute the background operations to prepare data for the first FMS service. Such background operations may be selected and executed under various use cases in the environment 200. The background processing system 218 may be implemented as hardware, software, and/or a combination of hardware and software.

A data collector system 220 may be a servicing module included in the environment 200. In some implementations, a data collector system 220 may include and/or control databases such as FMS data lake 240, as shown in FIG. 2. In some other implementations, a data collector system 220 may include and/or control one or more databases, without including and/or controlling the FMS data lake 240. In implementations where FMS data lake 240 is not included in the data collector system 220, the FMS data lake may be a separate database which is in communication with at least one of the message bus 204, a module among service modules 208-220, and the connected FMS micro-services 206.

The data collector system 220 may receive or generate data associated with one or more of the servicing modules (e.g., the context analyzer system 208, the recommender engine 212, the prediction engine 210, the background processing system 218, and the data collector system 220). The data collector system 220 may also store the usable data in a data repository (e.g., FMS data lake 240 or another database) for later use or retrieval by at least one of the servicing modules. In some implementations, the data collector system 220 may provide data repository (e.g., FMS data lake 240 or another database) where all raw data in their native format until the data are needed. In this way, the data may be stored in a flat architecture, with each data element tagged with a set of metadata. The data collector system 220 may be used for various use cases in the environment 200. The data collector system 220 may be implemented as hardware, software, and/or a combination of hardware and software.

The service mesh 242 may be an infrastructure layer of the environment 200 for handling service-to-service communication from, e.g., the connected FMS cloud services platform 114 to other cloud services (not depicted) of an entity. The other cloud services may include a cloud-based synthetic vision system (SVS), a cloud-based ground proximity warning system (GPWS), a cloud-based radar system, a cloud-based engine system, a cloud-based wheel system, a cloud-based brake system, a cloud-based power system, and/or a cloud-based auxiliary power system (collectively, "cloud avionics services"). The service mesh 242 may receive messages from and transmit messages to the cloud avionics services for the connected FMS cloud services platform 114. The service mesh 242 may be implemented as hardware, software, and/or a combination of hardware and software.

The service mesh 242 may also receive, via the API gateway 202, user request(s) for a recommendation process and/or an invoke micro-service process. The service mesh 242 may process the user request(s) for the invoke micro-service process and/or the recommendation process. For instance, the service mesh 242 may receive a user request; determine whether the user request is for a recommendation process or an invoke micro-service process (e.g., based on an indicator in a header or message of the user request); if it is determined that the user request is for a recommendation process, forward the user request to the API mashup generator 244 (e.g., via the service discovery agent 214) and transmit a response message, if any, from the API mashup generator 244 to the user device; and if it is determined that the user request is for an invoke micro-service process, forward the user request to an appropriate cloud avionics service and/or the service discovery agent 214 of the connected FMS cloud services platform 114, and transmit a response message, if any, from the cloud avionics services and/or the connected FMS cloud services platform 114.

The API mashup generator 244 may perform an API mashup generation process and/or an API mashup recommendation process. The API mashup generator 244 may perform the API mashup generation process in response to a user request (e.g., a system administrator), every set period of time, or in response to an update to the API data (e.g., to update the generated API mashups). The API mashup generator 244 may perform the API mashup recommendation process in response to receiving a user request for a recommendation process from the service mesh 242. The API mashup generator 244 may be implemented as hardware, software, and/or a combination of hardware and software.

The API mashup generation process may generate one or more API mashups. Generally, the API mashup generation process executed by the API mashup generator 244 may include: obtaining API data for a plurality of APIs; processing the API data for the plurality of APIs to form a tree structure based on a text analysis of keywords of the API data; generating API mashups based on the tree structure and one or more of a plurality of example API datasets; and storing the generated API mashups with associated keywords in the API DB 246.

The API mashup recommendation process may transmit a list of one or more API mashups (e.g., generated according to the above process) to a user device, in response to a user request. Generally, the API mashup recommendation process executed by the API mashup generator 244 may include: receiving a user request (e.g., a service query) from a user (e.g., via a user device and the service mesh 242), wherein the user request may include an application requirement; determining whether any keywords of the stored API mashups in the API DB 246 are within a threshold similarity to the application requirement; and in response to determining one or more keywords are within the threshold similarity, transmitting a recommendation message to the user (e.g., via the user device and the service mesh 242), wherein the recommendation message may include one or more API mashups that correspond to the one or more keywords.

The API DB 246 may store the API data and/or the generated one or more API mashups with the associated keywords. For instance the API data and/or the generated one or more API mashups with the associated keywords may be stored in a structured manner (e.g., a relational DB) or a non-structured manner (e.g., non-relational DB, such as noSQL or newSQL).

The fault service 248 may perform fault injection of the connected FMS cloud services platform 114, as discussed in more detail below with respect to FIGS. 3 and 4. Generally, to perform the fault injection, the fault service 248 may inject one or more of (1) physical node faults, (2) virtualization level faults, (3) service level faults, and/or (4) network faults, to various components of the connected FMS cloud services platform 114.

The watchdog service 250 may collect platform data of the connected FMS cloud services platform 114 before, during, or after the fault service 248 executes fault injection, and process the collected platform data to generate outputs for improving the fault tolerance of the connected FMS cloud services platform 114, as discussed in more detail below with respect to FIGS. 3 and 4. Generally, the watchdog service 250 may collect responses of the connected FMS cloud services platform 114 while the fault service 248 performs fault injection, and evaluate the responses of the connected FMS cloud services platform 114 with respect to a steady state behavior, to improve the reliability of the connected FMS cloud services platform 114.

The number and arrangement of modules, devices, and networks shown in FIG. 2 are provided as an example. In practice, there may be additional modules and devices, fewer modules, devices and/or networks, different modules, devices and/or networks, or differently arranged modules, devices and/or networks than those shown in FIG. 2. Furthermore, two or more devices included in environment 200 of FIG. 2 may be implemented within a single device, or a single device in the environment 200 of FIG. 2 may be implemented as multiple, distributed devices. Additionally, or alternatively, a set of devices (e.g., one or more devices) of environment 200 may perform one or more functions described as being performed by another set of devices of environment 200. Each servicing module (e.g., the context analyzer system 208, the recommender engine 212, the prediction engine 210, the background processing system 218, and the data collector system 220) may perform its functions using one or more computer processors, and in some implementations, each servicing module may comprise the one or more computer processors as a component therein.

Figure 3:
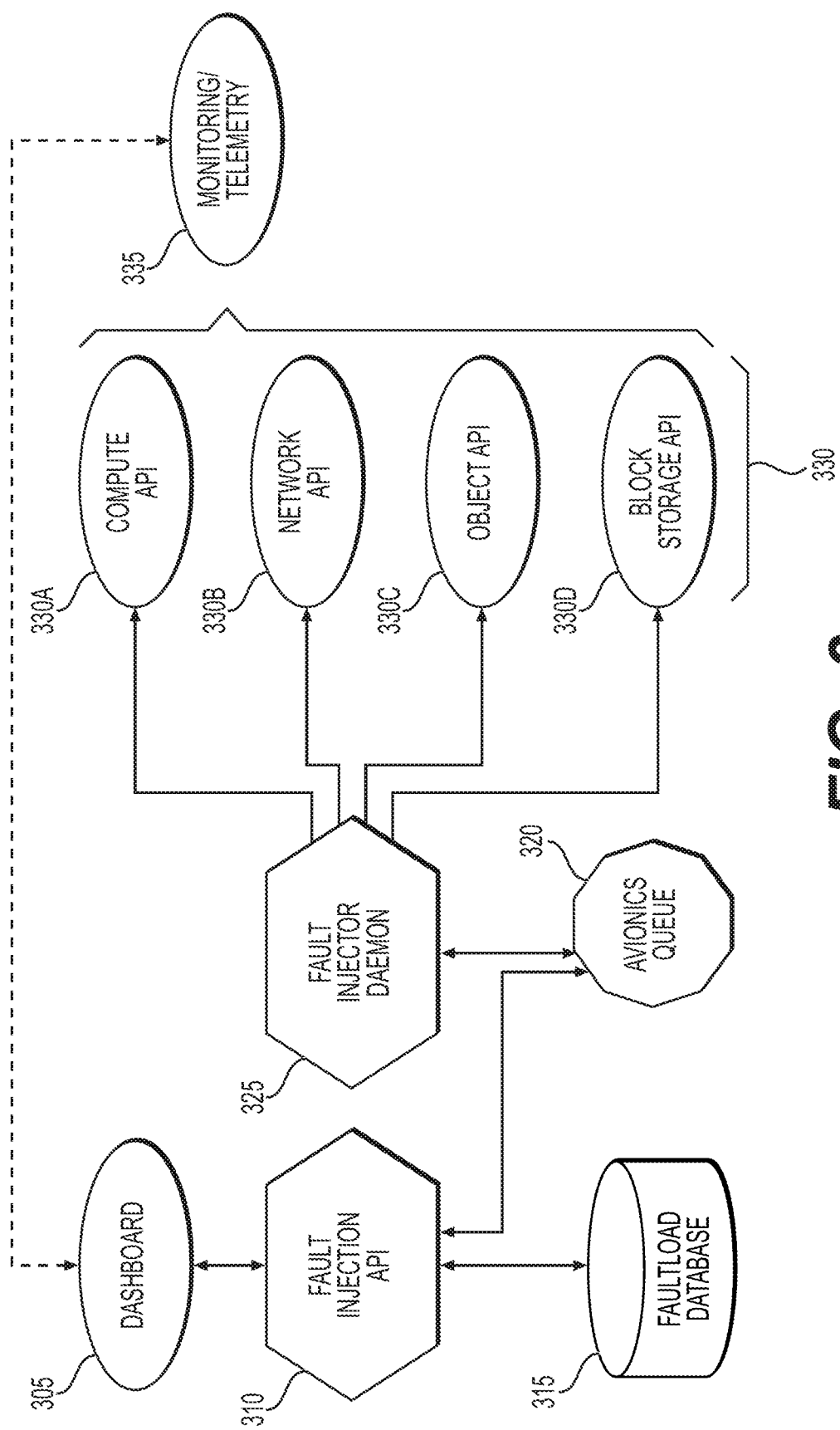
FIG. 3 depicts a block diagram of a system for fault injection of a connected FMS cloud services platform, according to one or more embodiments.

FIG. 3 depicts a block diagram of a system for fault injection of a connected FMS cloud services platform, according to one or more embodiments. The system 300 may automatically (or in response to a user request) and randomly perform fault injection on the connected FMS cloud services platform 114, and evaluate the results to improve the reliability of the connected FMS cloud services platform 114. For instance, the system 300 may (1) build a hypothesis about a steady state behavior of the connected FMS cloud services platform 114; (2) identify user context and criticality of micro-services for end-user interactions; (3) inject randomized faults into the connected FMS cloud services platform 114; (4) observe responses of the connected FMS cloud services platform 114 and detect anomaly patterns in the responses; and (5) iteratively adjust responses based on micro-service level criticality and/or detected anomaly patterns.

The system 300 may include a dashboard 305, a fault injection API 310, a fault-load database 315, an avionics queue 320, a fault injector daemon 325, one or more platform APIs 330 (such as a compute API 330A, a network API 330B, an object API 330C, and/or a block storage API 330D), and/or a monitoring/telemetry section 335.

The avionics queue 320 may a queue of received requests for micro-services by the API gateway 202 that have not yet been transmitted to an appropriate API endpoint for the one or more platform APIs 330 (such as the compute API 330A, the network API 330B, the object API 330C, and/or the block storage API 330D). The one or more platform APIs 330 (such as the compute API 330A, the network API 330B, the object API 330C, and/or the block storage API 330D) may correspond to the various components of the connected FMS cloud services platform 114 discussed above with respect to FIG. 2.

The monitoring/telemetry section 335 may correspond to the watchdog service 250 discussed above. The watchdog service 250, as discussed above, may collect platform data of the connected FMS cloud services platform 114 before, during, or after the fault service 248 executes fault injection, and process the collected platform data to generate outputs for improving the fault tolerance of the connected FMS cloud services platform 114. The watchdog service 250 may store the collected platform data in the FMS data lake 240 or other database, such as the fault-load database 315.

To collect the platform data, the watchdog service 250 may collect monitoring and telemetry data for the micro-services, application insights, log analytics, and/or low-level container logs. The watchdog service 250 may share the platform data with the context analyzer system 208 of FIG. 2.

The watchdog service 250 may extract a portion of the platform data that occurs during average load on the connected FMS cloud services platform 114 or when the connected FMS cloud services platform 114 is idle, which may be referred to as steady state of the connected FMS cloud services platform 114. The watchdog service 250 may calculate a steady state metric that characterizes the steady state of the connected FMS cloud services platform 114. The steady state metric may be used as a baseline, and the steady state metric may be a vector of a threshold values for various resources, micro-services loads, hard loads, message loads, etc. The watchdog service 250 may build the hypothesis about the steady state behavior of the connected FMS cloud services platform 114 by determining the steady state metric.

The watchdog service 250 may identify user context and criticality of micro-services for end-user interactions by requesting the contextual data from the context analyzer system 208. The context analyzer system 208 may use the platform data and the contextual data to determine micro-services and times of use for the micro-services that end users use; determine a user context and a criticality of micro-service for each micro-service of the connected FMS cloud services platform 114 with respect to end user circumstances and/or time of day; and transmit the contextual data to the watchdog service 250.

To observe responses of the connected FMS cloud services platform 114, the watchdog service 250 may collect platform data during fault injection performed by the fault service 248. To detect anomaly patterns in the responses, the watchdog service 250 may obtain the platform data from during the fault injection, determine a state metric (like how the watchdog service 250 determines the steady state metric); compare the state metric to the steady state metric; and if the state metric is more than a threshold difference from the steady state metric, detect an anomaly pattern.

For instance, as the watchdog service 250 observes a runtime behavior under fault load from the injection of faults by the fault service 248, the watchdog service 250 may generate dependability models. The dependability models may include quantitative data about performance loads. Since the dependability models and the quantitative data indicate impact on the connected FMS cloud services platform 114 at a micro-service level, an increase in request latency or CPU utilization may be symptoms that a micro-service is operating in a degraded mode, even though from an end user's perspective the connected FMS cloud services platform 114 may be working properly.

To iteratively adjust responses based on micro-service level criticality and/or detected anomaly patterns, the watchdog service 250 may transmit instructions to the fault service 248 to stop/change a current fault scenario based on the contextual data and/or a detection of an anomaly pattern. For instance, when the contextual data indicates a micro-service may receive above average load, as indicated by the user context and/or the criticality of the micro-service for each micro-service of the connected FMS cloud services platform 114 with respect to end user circumstances and/or time of day, the watchdog service 250 may instruct the fault service to change a current fault scenario to a different fault scenario that does not affect the micro-service that is expected to receive above average load. Alternatively or additionally, when the watchdog service 250 detects one or more anomaly patterns, the watchdog service 250 may transmit instructions to the fault service 248 to stop/change the current fault scenario to avoid injecting faults to one or more micro-service that triggered the one or more anomaly patterns.

The watchdog service 250 may collect and analyze data of observed response(s) to build hypotheses about how proposed treatments will affect the steady state of the connected FMS cloud services platform 114.

The watchdog service 250 may also dynamically scale down the fault injection of the fault service 248 (e.g., reduce the injection rate) on demand. In this manner, the watchdog service 250 may enable the context analyzer system 208 to measure a system recovery factor. The system recovery factor may be a time from when the instruction to stop/change the current fault scenario until the state metric is approximately similar to the steady state metric.

The dashboard 305 may be a user interface (UI) on a user device (e.g., of a system administrator of the connected FMS cloud services platform 114, or any authorized user). The dashboard 305 may display information, data, graphics, etc. (collectively, "display UI") to the authorized user, based on the collected platform data. The authorized user may interact with the display UI to: select when/if automated fault injection is to proceed; initiate user requested fault injection; and select one or more types of fault injection for either the automated or user requested fault injection.

To select if automated fault injection is to proceed, the display UI may have an automated injection on/off input mechanism, such as a toggle, button, etc. To control when automated fault injection is to proceed, the display UI may have selectable time slots selectable by the authorized user, or the authorized user may select system-determined time for fault injection. The system-determined time for fault injection may correspond to the automated injection discussed above. The system-determined time for fault injection may analyze collected platform data and identify user context and criticality of micro-services for end-user interactions with respect to time. For instance, the watchdog service 250 may determine that end users use some micro-services at specific time periods, and determine to perform fault injection of those micro-services at different times from the specific time periods.

To initiate user requested fault injection, the display UI may have an initiate injection on/off input mechanism, such as a toggle, button, etc. To select one or more types of fault injection for either the automated or user requested fault injection, the display UI may have a selection mechanism to select one or a combination of (1) physical node faults, (2) virtualization level faults, (3) service level faults, and/or (4) network faults, such as toggles, buttons, etc.

Based on authorized user inputs, the user device may transmit an initiate fault injection message to the fault injection API 310 (if the user selects the initiate injection on/off input mechanism) and/or the user device may transmit an authorized user settings message to the watchdog service 250. The authorized user settings message may include information based on the authorized user inputs, such as selections of if/when automated injection is to occur, and/or selections of the one or more types of fault injection. If the selections indicate automated injection is to occur, the watchdog service 250 may proceed to: determine when to initiate automated injection, as discussed above; and in response to determining to initiate automated injection at determined time, generate and transmit an initiate fault injection message to the fault injection API 310. The initiate fault injection message may include information about the selections of the one or more types of fault injection.

The fault injection API 310, the fault-load database 315, and the fault injector daemon 325 may correspond to the fault service 248, discussed above. As discussed above, the fault service 248 may perform fault injection of the connected FMS cloud services platform 114. Specifically, the fault injection API 310 may receive the initiate fault injection message from the user device of the authorized user or from the watchdog service 250. The fault injection API 310 may receive the initiate fault injection message, confirm that the initiate fault injection message complies with an API framework of the fault service 248, and transmit the initiate fault injection message to the fault injector daemon 325.

The fault-load database 315 may include a plurality of fault scenarios that correspond to (1) physical node faults, (2) virtualization level faults, (3) service level faults, and/or (4) network faults. The fault-load database 315 may be accessed by the fault injection API 310 to retrieve the plurality of fault scenarios (or only some of the plurality of fault scenarios based on the selections of the one or more types of fault injection); and the fault injection API 310 may transmit the retrieved fault scenarios to the fault injector daemon 325. Alternatively, the fault-load database 315 may be accessed by the fault injector daemon 325 to retrieve the plurality of fault scenarios (or only some of the plurality of fault scenarios based on the selections of the one or more types of fault injection).

The fault injector daemon 325 may receive the initiate fault injection message from the fault injection API 310. The fault injector daemon 325, in response to receiving the initiate fault injection message, may control messages into and out of the avionics queue 320, e.g., by controlling all message traffic between the avionics queue 320 and the one or more platform APIs 330. Thereafter, the fault injector daemon 325 may inject faults based on the retrieved fault scenarios. For instance, the fault injector daemon 325 may select one of the retrieved fault scenarios at random, e.g. based on a random selection process; and then transmit one or more fault message(s) to one of the one or more platform APIs 330. The one or more fault message(s) may be one or more instruction(s) to perform a specific action that creates one or more of (1) physical node faults, (2) virtualization level faults, (3) service level faults, and/or (4) network faults on the connected FMS cloud services platform 114. For instance, some fault scenarios may be one or a combination of: (1) terminate virtual machine instances in a cluster; inject latency into requests between micro-services; (2) fail requests between Connected FMS services; (3) fail a micro-service; partition (partially or entirely) an entire deployment region, so to make it partially or totally unavailable; (4) scale high priority requests dynamically, while simultaneously stressing the system by removing virtual machines/nodes.

For instance, to inject faults based on the retrieved fault scenarios, fault injector daemon 325 may generate pre-modelled fault injections based on the selected fault scenario; and post data packets corresponding to generated pre-modelled fault injections on to the message bus 204, which are obtained by micro-services of the connected FMS cloud services platform 114.

Moreover, the fault injector daemon 325, via the fault injection API 310, may receive instructions from the watchdog service 250 to stop/change a current fault scenario. In response to receiving the instructions to stop/change the current fault scenario, the fault injector daemon 325 may stop the current fault scenario or change the current fault scenario to a new fault scenario.

Therefore, by injecting randomized faults into the FMS SaaS platform and evaluating and adjusting the responses thereto, the present disclosure may identify the potential failures of distributed and cloud software systems, while not interfering with end user response time by observing what happens at the FMS SaaS platform boundary. For instance, while the FMS SaaS platform may be a distributed and cloud software system, it can be fault tested as a single system by injecting real-world inputs (e.g., transient network failures, surges in incoming requests, malformed data inputs, etc.).

Figure 4:
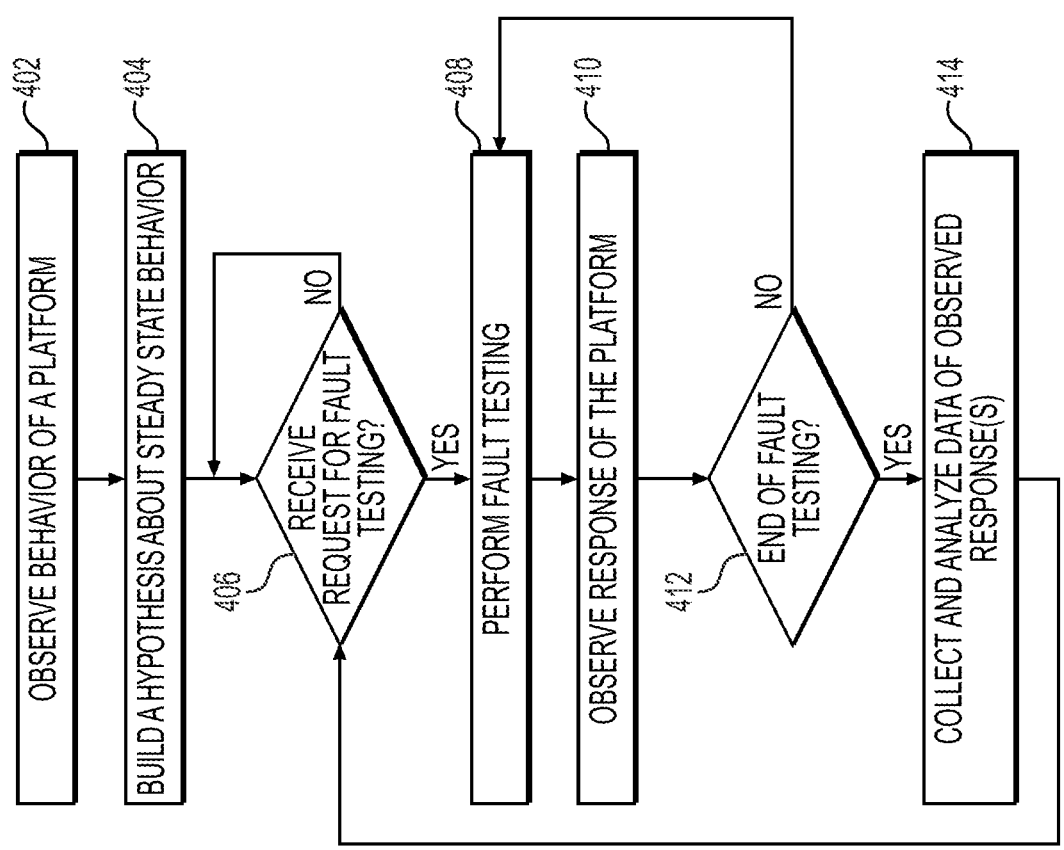
FIG. 4 depicts a flowchart of an exemplary method for fault injection of a connected FMS cloud services platform, according to one or more embodiments.

FIG. 4 depicts a flowchart 400 of an exemplary method for fault injection of a connected FMS cloud services platform, according to one or more embodiments. In the flowchart 400, the method may be performed by the system 300. Specifically, the watchdog service 250 may perform blocks 402, 404, 410, and 414, while the fault service 248 may perform blocks 406, 408, and 412.

In the flowchart 400, the method may start at block 402 to observe a behavior of a platform. Then, the method may proceed to block 404 to build a hypothesis about a steady state behavior based on the observing the behavior of the platform. For instance, the watchdog service 250 may collect the platform data and build the hypothesis about the steady state behavior, as discussed above with respect to FIG. 3.

Then, the method may proceed to block 406 to determine whether the fault service has received a request for fault injection. If the fault service 248 does not receive an initiate fault injection message (block 406: No), then, the method may return to block 406 to await an initiate fault injection message.

If the fault service 248 does receive an initiate fault injection message (block 406: Yes), the method may proceed to block 408 to perform the fault injection. For instance, the fault service 248 may obtain fault scenarios, select a fault scenario, and inject faults into the connected FMS cloud services platform 114.

Then, the method may proceed to block 410 to observe a response of the platform. For instance, the watchdog service 250 may collect platform data to obtain the response of the platform, as discussed above.

Then, the method may proceed to block 412 to determine whether it is the end of fault injection. If the fault service 248 does not receive instructions to stop the current fault scenario or if the fault service 248 receives instructions to change the current fault scenario (block 412: No), the method may proceed to block 408 to continue to perform the fault injection.

If the fault service 248 does receive instructions to stop the current fault scenario (block 412: Yes), the method may proceed to block 414 to collect and analyze data of observed response(s). For instance, the watchdog service 250 may analyze the data of the observed response(s) to build hypotheses about how proposed treatments will affect the steady state of the connected FMS cloud services platform 114, as discussed above. Then, the method may return to block 406 to await an initiate fault injection message.

Figure 5:
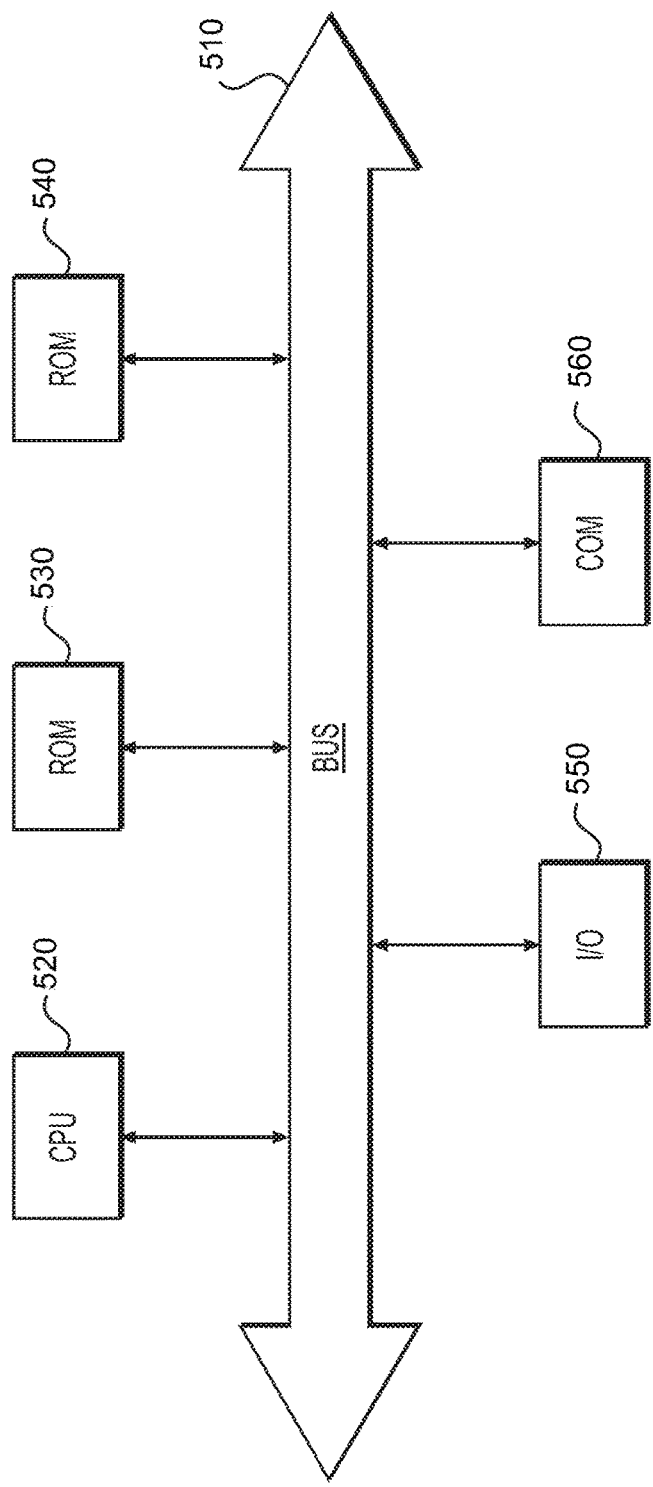
FIG. 5 depicts an example system that may execute techniques presented herein.

FIG. 5 depicts an example system that may execute techniques presented herein. FIG. 5 is a simplified functional block diagram of a computer that may be configured to execute techniques described herein, according to exemplary embodiments of the present disclosure. Specifically, the computer (or "platform" as it may not be a single physical computer infrastructure) may include a data communication interface 560 for packet data communication. The platform may also include a central processing unit ("CPU") 520, in the form of one or more processors, for executing program instructions. The platform may include an internal communication bus 510, and the platform may also include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for fault injection and ensuring failsafe SaaS platforms, comprising:
    observing a behavior of a platform;
    building a hypothesis about a steady state behavior based on the observing the behavior of the platform;
    determining whether a request for fault injection has been received;
    in response to receiving the request for the fault injection, performing the fault injection;
    observing a response of the platform to the fault injection by:
        collecting platform data during the fault injection; and
        detecting anomaly patterns in the response of the platform;
    stopping and/or changing the fault injection based on contextual data and a detection of an anomaly pattern, wherein the stopping and/or changing the fault injection includes at least, when the contextual data indicates a micro-service is expected to receive an above average load, changing the fault injection to a different fault injection that does not affect the micro-service that is expected to receive the above average load;
    determining whether the fault injection is at an end; and
    in response to determining that the fault injection is at the end, collect and analyze data of observed response(s).

2. The method of claim 1, wherein the observing the behavior of the platform includes collecting platform data for the platform, the platform data including monitoring and telemetry data for micro-services of the platform, application insights, log analytics, and/or low-level container logs.

3. The method of claim 2, wherein the building the hypothesis about the steady state behavior based on the observing the behavior of the platform includes
- extracting a portion of the platform data that occurs during an average load on the platform or when the platform is idle; and
- calculating a steady state metric that characterizes the steady state of the platform based on the extracted portion of the platform data, the steady state metric being a vector of threshold values for resources, micro-services loads, hard loads, and/or message loads.

4. The method of claim 3, wherein the performing the fault injection includes:
- retrieving one or more fault scenarios from a fault-load database;
- selecting a fault scenario of the retrieved one or more fault scenarios; and
- injecting the selected fault scenario into the platform.

5. The method of claim 4, wherein fault-load database may include a plurality of fault scenarios that correspond to (1) physical node faults, (2) virtualization level faults, (3) service level faults, and/or (4) network faults.

6. The method of claim 1, wherein the detecting the anomaly patterns in the response of the platform includes:
- determining a state metric based on the platform data during the fault injection;
- comparing the state metric to a steady state metric; and
- in response to the state metric being more than a threshold difference from the steady state metric, detecting an anomaly pattern.

7. A system for fault injection and ensuring failsafe SaaS platforms, the system comprising:
- a memory storing instructions; and
- a processor executing the instructions to perform a process including:
  - observing a behavior of a platform;
  - building a hypothesis about a steady state behavior based on the observing the behavior of the platform
  - determining whether a request for fault injection has been received;
  - in response to receiving the request for the fault injection, performing the fault injection;
  - observing a response of the platform to the fault injection by:
    - collecting platform data during the fault injection; and
    - detecting anomaly patterns in the response of the platform;
  - stopping and/or changing the fault injection based on contextual data and a detection of an anomaly pattern, wherein the stopping and/or changing the fault injection includes at least, when the contextual data indicates a micro-service is expected to receive an above average load, changing the fault injection to a different fault injection that does not affect the micro-service that is expected to receive the above average load;
  - determining whether the fault injection is at an end; and
  - in response to determining that the fault injection is at the end, collect and analyze data of observed response(s).

8. The system of claim 7, wherein the observing the behavior of the platform includes collecting platform data for the platform, the platform data including monitoring and telemetry data for micro-services of the platform, application insights, log analytics, and/or low-level container logs.

9. The system of claim 8, wherein the building the hypothesis about the steady state behavior based on the observing the behavior of the platform includes
- extracting a portion of the platform data that occurs during an average load on the platform or when the platform is idle; and
- calculating a steady state metric that characterizes the steady state of the platform based on the extracted portion of the platform data, the steady state metric being a vector of threshold values for resources, micro-services loads, hard loads, and/or message loads.

10. The system of claim 9, wherein the performing the fault injection includes:
- retrieving one or more fault scenarios from a fault-load database;
- selecting a fault scenario of the retrieved one or more fault scenarios; and
- injecting the selected fault scenario into the platform.

11. The system of claim 10, wherein fault-load database may include a plurality of fault scenarios that correspond to (1) physical node faults, (2) virtualization level faults, (3) service level faults, and/or (4) network faults.

12. The system of claim 7, wherein the detecting the anomaly patterns in the response of the platform includes:
- determining a state metric based on the platform data during the fault injection;
- comparing the state metric to a steady state metric; and
- in response to the state metric being more than a threshold difference from the steady state metric, detecting an anomaly pattern.

13. A non-transitory computer-readable medium storing instructions that, when executed by a processor, cause the processor to perform a method for fault injection and ensuring failsafe SaaS platforms, the method comprising:
- observing a behavior of a platform;
- building a hypothesis about a steady state behavior based on the observing the behavior of the platform
- determining whether a request for fault injection has been received;
- in response to receiving the request for the fault injection, performing the fault injection;
- observing a response of the platform to the fault injection by:
  - collecting platform data during the fault injection; and
  - detecting anomaly patterns in the response of the platform;
- stopping and/or changing the fault injection based on contextual data and a detection of an anomaly pattern, wherein the stopping and/or changing the fault injection includes at least, when the contextual data indicates a micro-service is expected to receive an above average load, changing the fault injection to a different fault injection that does not affect the micro-service that is expected to receive the above average load;
- determining whether the fault injection is at an end; and
- in response to determining that the fault injection is at the end, collect and analyze data of observed response(s).

14. The non-transitory computer-readable medium of claim 13, wherein the observing the behavior of the platform includes collecting platform data for the platform, the platform data including monitoring and telemetry data for micro-services of the platform, application insights, log analytics, and/or low-level container logs.

15. The non-transitory computer-readable medium of claim 14, wherein the building the hypothesis about the steady state behavior based on the observing the behavior of the platform includes extracting a portion of the platform data that occurs during an average load on the platform or when the platform is idle; and calculating a steady state metric that characterizes the steady state of the platform based on the extracted portion of the platform data, the steady state metric being a vector of threshold values for resources, microservices loads, hard loads, and/or message loads.

16. The non-transitory computer-readable medium of claim 15, wherein the performing the fault injection includes:

retrieving one or more fault scenarios from a fault-load database;

selecting a fault scenario of the retrieved one or more fault scenarios; and injecting the selected fault scenario into the platform.

17. The non-transitory computer-readable medium of claim 13, wherein the detecting the anomaly patterns in the response of the platform includes:

determining a state metric based on the platform data during the fault injection;

comparing the state metric to a steady state metric; and in response to the state metric being more than a threshold difference from the steady state metric, detecting an anomaly pattern.

* * * * *